US012001386B2

(12) United States Patent
Christensen et al.

(10) Patent No.: US 12,001,386 B2
(45) Date of Patent: Jun. 4, 2024

(54) DISABLING PROCESSOR CORES FOR BEST LATENCY IN A MULTIPLE CORE PROCESSOR

(71) Applicant: Dell Products L.P., Round Rock, TX (US)

(72) Inventors: Michael Christensen, Round Rock, TX (US); Yuwei Cai, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 25 days.

(21) Appl. No.: 17/871,034

(22) Filed: Jul. 22, 2022

(65) Prior Publication Data

US 2024/0028558 A1 Jan. 25, 2024

(51) Int. Cl.
*G06F 15/82* (2006.01)
*G06F 9/30* (2018.01)

(52) U.S. Cl.
CPC .......... *G06F 15/82* (2013.01); *G06F 9/30123* (2013.01)

(58) Field of Classification Search
CPC .... G06F 15/28; G06F 9/30123; G06F 1/3293; G06F 1/3296; G06F 3/1221
See application file for complete search history.

(56) References Cited

U.S. PATENT DOCUMENTS

| | | | | |
|---|---|---|---|---|
| 2007/0118773 A1* | 5/2007 | Tsuji | ..................... | G06F 1/3203 713/300 |
| 2015/0081985 A1* | 3/2015 | Archer | ................. | G06F 3/0671 711/147 |
| 2016/0216754 A1* | 7/2016 | Distefano | ............ | G06F 1/3234 |
| 2017/0185417 A1 | 6/2017 | Khatri | | |
| 2018/0341614 A1* | 11/2018 | Khatri | ................ | G06F 13/4068 |
| 2019/0220434 A1* | 7/2019 | Dai | ........................ | G06F 12/02 |
| 2022/0075655 A1* | 3/2022 | Thyagaturu | .......... | G06F 9/5088 |
| 2022/0137964 A1* | 5/2022 | Michaud | ............ | G06F 9/30047 718/102 |
| 2023/0315191 A1* | 10/2023 | Alverson | ............. | G06F 1/3206 713/323 |

\* cited by examiner

*Primary Examiner* — Jaweed A Abbaszadeh
*Assistant Examiner* — Hyun Soo Kim
(74) *Attorney, Agent, or Firm* — Larson Newman, LLP

(57) ABSTRACT

An information handling system includes a model-specific register and a basic input/output system (BIOS). The BIOS receives a selection of a number of processor cores to have enabled in a multiple core processor. In response to the reception of the selection of the number of processor cores to have enabled, the BIOS calculates a different latency for each of a plurality of processor cores in the multiple core processor. Based on the calculated different latency for each of the processor cores, the BIOS determines a first subset of the processor cores to enable and a second subset of the processor cores to disable. The BIOS sets bits in the model-specific register to indicate that the first subset of the processor cores is enabled and the second subset of the processor cores is disabled.

17 Claims, 7 Drawing Sheets

DISABLING PROCESSOR CORES FOR BEST LATENCY IN A MULTIPLE CORE PROCESSOR

CROSS REFERENCE TO RELATED APPLICATION

Related subject matter is contained in co-pending U.S. application Ser. No. 17/871,078 entitled "CORE MAPPING BASED ON LATENCY IN A MULTIPLE CORE PROCESSOR," filed Jul. 22, 2022, the disclosure of which is hereby incorporated by reference.

FIELD OF THE DISCLOSURE

This disclosure generally relates to information handling systems, and more particularly relates to disabling processor cores for best latency in a multiple core processor of an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a model-specific register and a basic input/output system (BIOS). The BIOS may receive a selection of a number of processor cores to have enabled in a multiple core processor. In response to the reception of the selection of the number of processor cores to have enabled, the BIOS may calculate a different latency for each of a plurality of processor cores in the multiple core processor. Based on the calculated different latency for each of the processor cores, the BIOS may determine a first subset of the processor cores to enable and a second subset of the processor cores to disable. The BIOS may set bits in the model-specific register to indicate that the first subset of the processor cores is enabled and the second subset of the processor cores is disabled.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
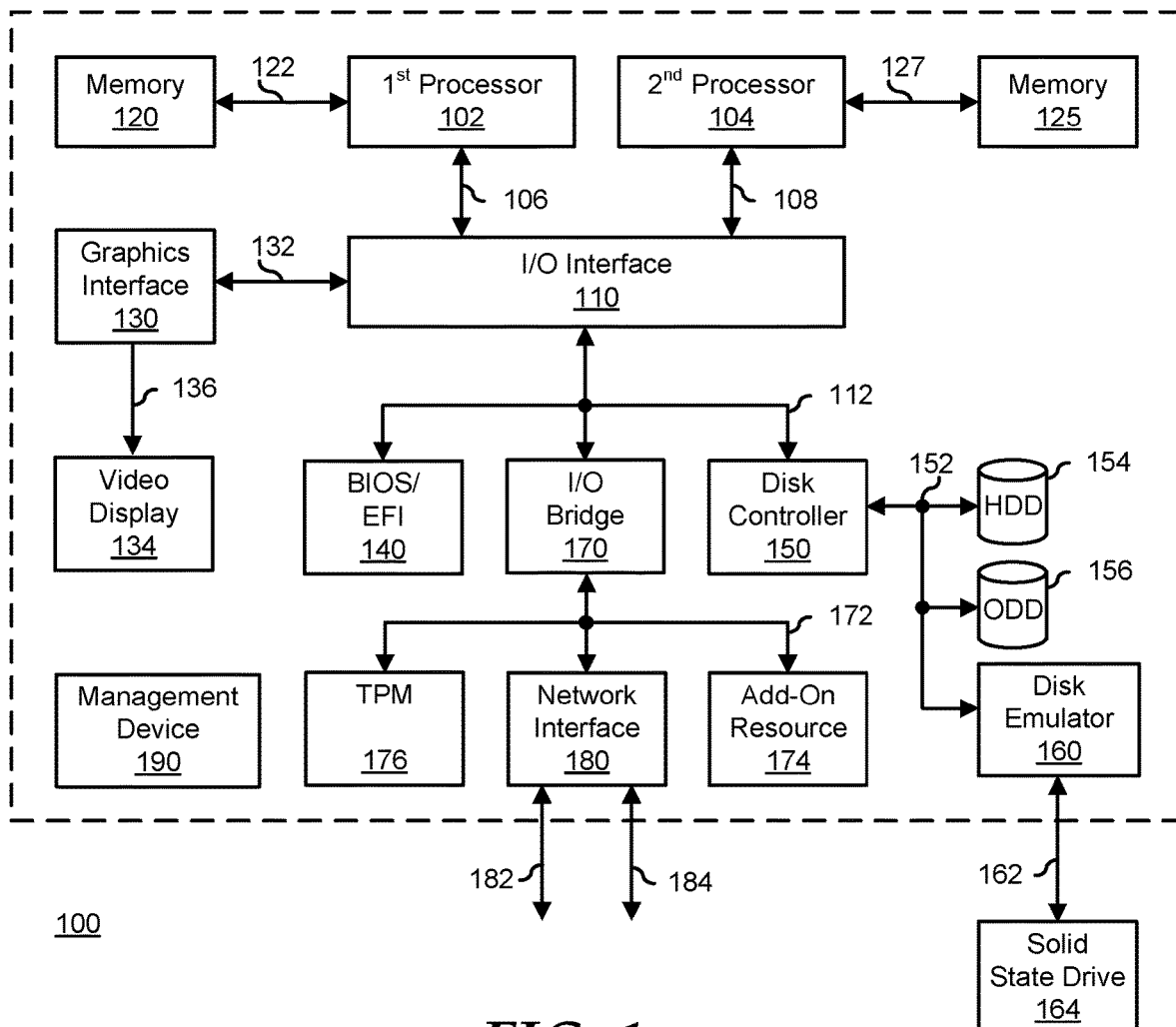
FIG. 1 is a block diagram illustrating a generalized information handling system according to an embodiment of the present disclosure.

FIG. 1 shows a generalized embodiment of an information handling system 100 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display.

Information handling system 100 can also include one or more buses operable to transmit information between the various hardware components.

Information handling system 100 can include devices or modules that embody one or more of the devices or modules described below and operates to perform one or more of the methods described below. Information handling system 100 includes a processors 102 and 104, an input/output (I/O) interface 110, memories 120 and 125, a graphics interface 130, a basic input and output system/universal extensible firmware interface (BIOS/UEFI) module 140, a disk controller 150, a hard disk drive (HDD) 154, an optical disk drive (ODD) 156, a disk emulator 160 connected to an external solid state drive (SSD) 162, an I/O bridge 170, one or more add-on resources 174, a trusted platform module (TPM) 176, a network interface 180, a management device 190, and a power supply 195. Processors 102 and 104, I/O interface 110, memory 120, graphics interface 130, BIOS/UEFI module 140, disk controller 150, HDD 154, ODD 156, disk emulator 160, SSD 162, I/O bridge 170, add-on resources 174, TPM 176, and network interface 180 operate together to provide a host environment of information handling system 100 that operates to provide the data processing functionality of the information handling system. The host environment operates to execute machine-executable code, including platform BIOS/UEFI code, device firmware, operating system code, applications, programs, and the like, to perform the data processing tasks associated with information handling system 100.

In the host environment, processor 102 is connected to I/O interface 110 via processor interface 106, and processor 104 is connected to the I/O interface via processor interface 108. Memory 120 is connected to processor 102 via a memory interface 122. Memory 125 is connected to processor 104 via a memory interface 127. Graphics interface 130 is connected to I/O interface 110 via a graphics interface 132 and provides a video display output 136 to a video display 134. In a particular embodiment, information handling system 100 includes separate memories that are dedicated to each of processors 102 and 104 via separate memory interfaces. An example of memories 120 and 125 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 140, disk controller 150, and I/O bridge 170 are connected to I/O interface 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 140 includes BIOS/UEFI code operable to detect resources within information handling system 100, to provide drivers for the resources, initialize the resources, and access the resources. BIOS/UEFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 3394 (Firewire) interface, a proprietary interface, or a combination thereof. Alternatively, solid-state drive 164 can be disposed within information handling system 100.

I/O bridge 170 includes a peripheral interface 172 that connects the I/O bridge to add-on resource 174, to TPM 176, and to network interface 180. Peripheral interface 172 can be the same type of interface as I/O channel 112 or can be a different type of interface. As such, I/O bridge 170 extends the capacity of I/O channel 112 when peripheral interface 172 and the I/O channel are of the same type, and the I/O bridge translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as I/O interface 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Management device 190 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 100. In particular, management device 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management device 190 can include a network connection to an external management system, and the management device can communicate with the management system to report status information for information handling system 100, to receive BIOS/UEFI or system firmware updates, or to perform other task for managing and controlling the operation of information handling system 100.

Management device 190 can operate off of a separate power plane from the components of the host environment so that the management device receives power to manage information handling system 100 when the information handling system is otherwise shut down. An example of management device 190 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 190 may further include associated memory devices, logic devices, security devices, or the like, as needed or desired.

Figure 2:
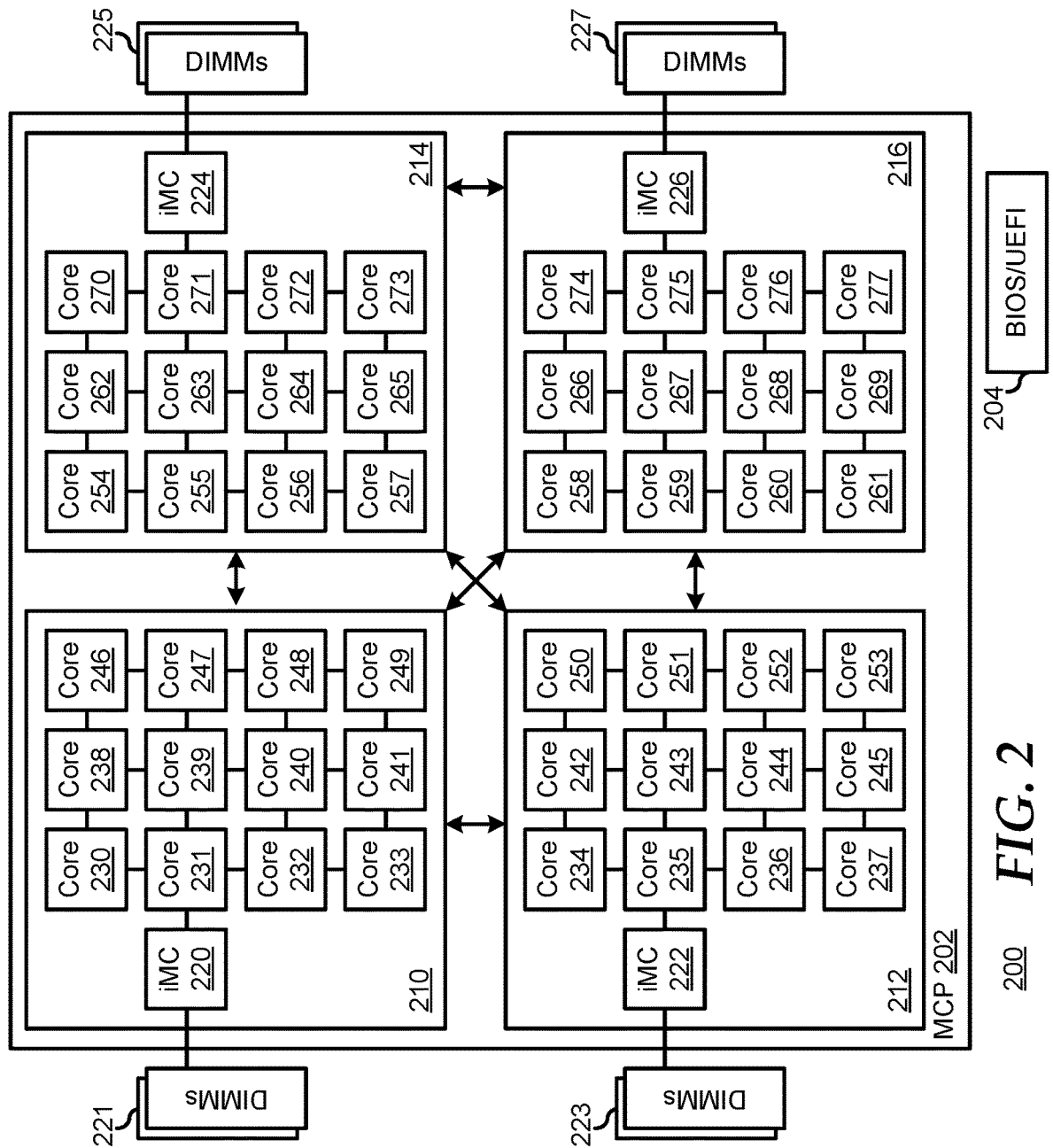
FIG. 2 illustrates a multiple processor core configuration according to an embodiment of the present disclosure.

FIG. 2 illustrates an information handling system 200 similar to information handling system 100. The architecture of information handling system 200 includes a multi-chip processor (MCP) 202, and a system basic input/output system (BIOS)/universal extensible firmware interface (UEFI) 204. MCP 202 includes four processor die 210, 212, 214, and 216 that are connected together via point-to-point data links, such that processor die 210 is connected to processor die 212 via a first point-to-point data link, to processor die 214 via a second point-to-point data link, and to processor die 216 via a third point-to-point data link. Similarly, processor die 212 is connected to processor die 214 via a fourth point-to-point data link and to processor die 216 via a fifth point-to-point data link, and finally, processor die 214 is connected to processor die 216 via a sixth point-to-point data link.

An example of the point-to-point data links include a coherent fabric between processor dies 210, 212, 214, and 216, such as a global memory interconnect (GMI) fabric. In certain examples, processor dies 210 and 212 may be located in one domain of MCP 202, and processor dies 214 and 216 may be assigned to another domain of the MCP. Additionally, each of processor dies 210, 212, 214, and 216 may be assigned as a different quadrant of MCP 202. For example processor die 210 may be assigned as quadrant 1 of MCP 202, processor die 212 may be assigned as quadrant 2 of the MCP, processor die 214 may be assigned as quadrant 3 of the MCP, and processor die 216 may be assigned as quadrant 4 of the MCP. In certain examples, MCP 202 may be one socket of a dual-socket chip for information handling system 200. Operations to enable and disable different cores in the second socket may be substantially similar to those described herein for MCP 202.

Each of processor die 210, 212, 214, and 216 any suitable number of processor cores, and an integrated memory controller. For example, each processor die may include, but are not limited to, eight processor dies, twelve processor dies, and sixteen processor dies. Processor die 210 includes an integrated memory controller 220, which in turn may be in communication with one or more dual in-line memory modules (DIMMs) 221. Processor die 212 includes an integrated memory controller 222, which in turn may be in communication with one or more DIMMs 223. Processor die 214 includes an integrated memory controller 224, which in turn may be in communication with one or more DIMMs 225. Processor die 216 includes an integrated memory controller 226, which in turn may be in communication with one or more DIMMs 227. An example of memory channels and associated DIMMs 221, 223, 225, and 227 includes memory devices in accordance with a double data rate (DDR) DIMM standard, such as a DDR-4 standard, a DDR-5 standard, or another DDR standard.

In certain examples, processor core identifications may assigned in any suitable manner. For example, the processor core identifications may start in the processor cores of one domain of MCP and go along to the processor cores of the other domain. In this example, processor die 210 may include processor cores 230, 231, 232, 233, 238, 239, 240, 241, 246, 247, 248, and 249. Processor die 212 may include processor cores 234, 235, 236, 237, 242, 243, 244, 245, 250, 251, 252, and 253. Processor die 214 may include processor cores 254, 255, 256, 257, 262, 263, 264, 265, 270, 271, 272, and 273. Processor die 214 may include processor cores 258, 259, 260, 261, 266, 267, 268, 269, 274, 275, 276, and 277.

Figure 3:
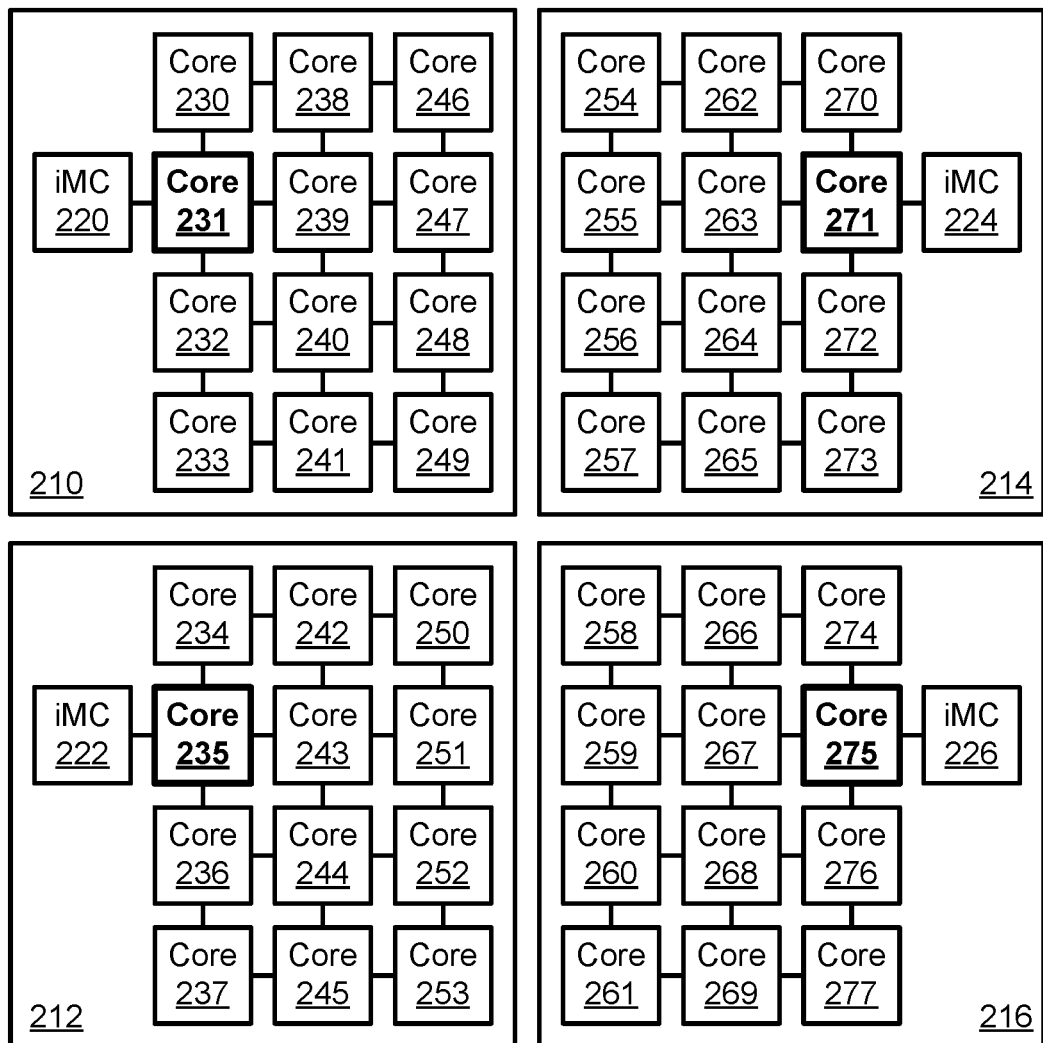
FIGS. 3 and 4 illustrate various processor core disablement configurations in a multiple core processor based on best latency according to an embodiment of the present disclosure.
Figure 4:
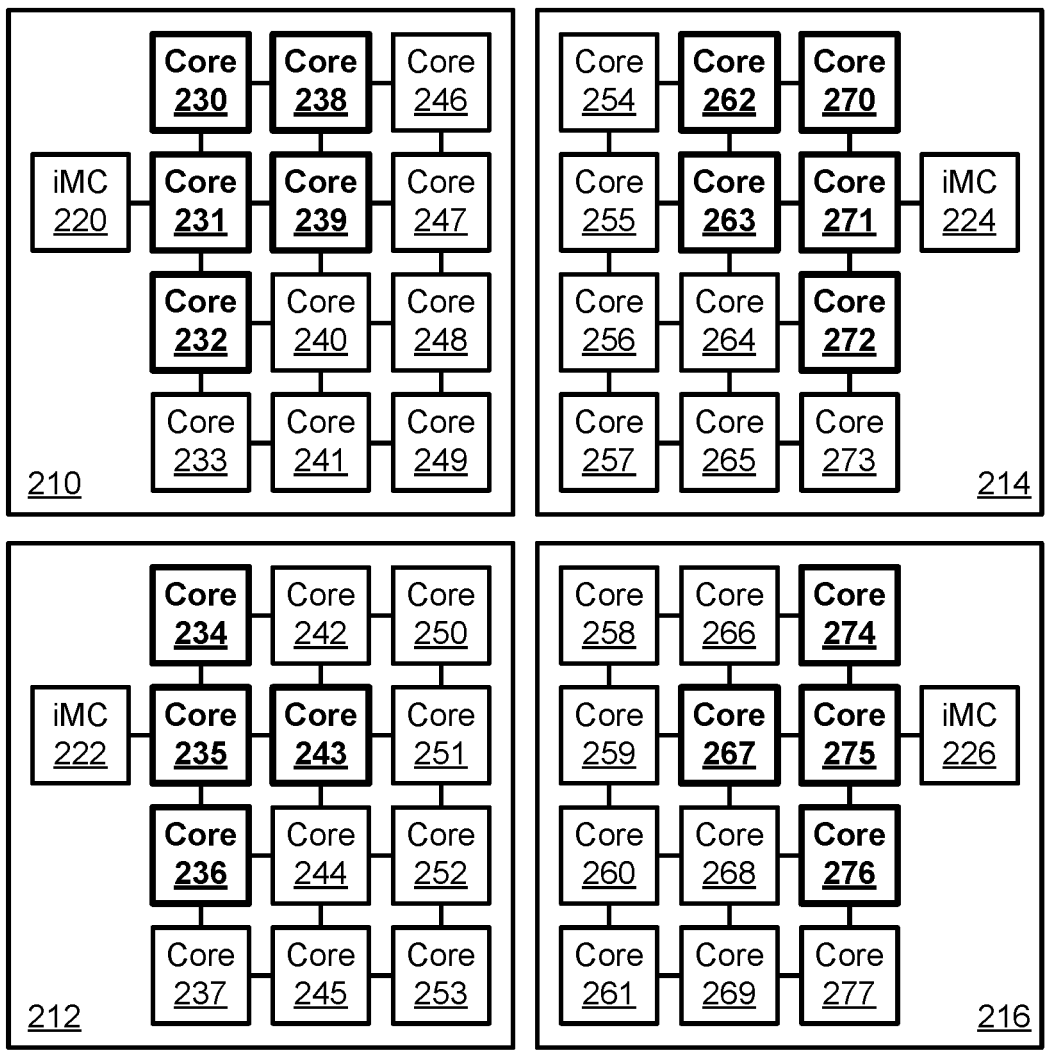

FIGS. 3 and 4 illustrate various processor core disablement configurations 300 and 400 in a multiple core processor based on best latency according to an embodiment of the present disclosure. In an example, various operating environments may not be capable of utilizing all of the processing resources of MCP 202. An operating environment may include an OS, a virtual machine manager (VMM), system BIOS/UEFI 204, an application or program, or other resources which utilize processing resources. For example, BIOS/UEFI 204, or an OS may be limited as to the number of cores that can be utilized by the BIOS/UEFI or OS. In another example, a program may be limited as to the number of threads that the application can spawn. In another example, an individual associated with the information handling system may select a particular number of processor cores to enable. In this example, the individual may utilize any suitable interface, such as a graphical user interface (GUI) on display device 134 of FIG. 1, to select a desired number of processor cores to be enabled.

In previous information handling system, in response to a selection of a particular number of cores, a number of cores that is equal to the excess number of cores will be disabled by BIOS/UEFI 204. For example, if four cores, then BIOS/UEFI 204 will disable forty-four cores on MCP 202. Further, in previous information handling systems, the disabled cores will be divided among processor dies 210, 212, 214, and 216. Continuing the above example, BIOS/UEFI 204 will disable eleven cores in each of processor dies 210, 212, 214, and 216, leaving one core per processor die enabled. In particular, BIOS/UEFI 204 accesses various elements of an advanced configuration and power interface (ACPI) system, including a static resource affinity table (SRAT) and a system locality information table (SLIT), to allocate the cores of processor dies 210, 212, 214, and 216. Information handling system 100 may be improved by BIOS 204 utilizing latencies between the different cores to integrated memory controllers 220, 222, 224, and 226 to determine what cores to enable and what cores to disable. In certain examples, the latency may be calculated based on any suitable operations that utilize distance of a core from integrated memory controllers 220, 222, 224, and 226 as a main consideration in the latency calculation. BIOS 204 may perform the latency calculations and select the lowest latency cores as the cores to leave enabled.

Referring to FIG. 3, if an individual associated with information handling system 200 selects that four processor cores should be enabled, BIOS 204 of FIG. 2 may utilize the different latencies between the processor cores and integrated memory controllers 220, 222, 224, and 226 to determine the processor cores to enable. In an example, the latency may be affected based on the distance or number of hops between a particular processor core and a particular one of integrated memory controllers 220, 222, 224, and 226. In this example, core 231 may have the lowest latency with respect to integrated memory controller 220 because the core does not have any hops within a communication path with the integrated memory controller. Cores 230, 239, and 232 may each have substantially the same latency based on these cores having one hop, such as core 231, within the communication path with the integrated memory controller 220. Core 249 may have the worst or longest latency with respect to memory controller 220 because this core has four hops within a communication path with the integrated memory controller.

In certain examples, the latency calculations for integrated memory controllers 222, 224, and 226 may be substantially similar to those described above with respect to integrated memory controller 220. For example, core 235 may have the lowest or best latency with respect to integrated memory controller 222, cores 234, 236, and 243 may have the next best latency, and core 253 may have the slowest or worst latency. Similarly, core 271 may have the lowest or best latency with respect to integrated memory controller 224, cores 270, 272, and 263 may have the next best latency, and core 257 may have the slowest or worst latency. Core 275 may have the lowest or best latency with respect to integrated memory controller 226, cores 274, 276, and 267 may have the next best latency, and core 261 may have the slowest or worst latency.

Based on the calculated latencies, BIOS 204 may enable cores 231, 235, 271, and 275 and disable all other cores when the individual selects to have four cores enabled. In an example, the enabled cores 231, 235, 271, and 275 are bolded in configuration 300 to identify these cores as being enabled. In certain examples, BIOS 204 may utilize a model-specific register (MSR) to disable particular cores within the MCP 202 of FIG. 1. For example, the MSR may include a number of bits equal to the number of cores in the MCP 202. In this example, the MSR for BIOS 204 may include 48 bits and setting a particular bit may disable the corresponding core. In an example, bit 0 of the MSR may correspond to core 230 and bit 47 of the MSR may correspond to core 277. In this example, BIOS 204 may set the bits of the MSR as follows: 101110111111111111111111111111111111111110111011.

Based on all bits except for bits 1, 5, 41, and 45 being set to a value of 1, all cores except those that correspond to bits 1, 5, 41, and 45 will be disabled. In this example, BIOS 204 setting a particular bit in MSR to '1' may disable the corresponding core. In another example, BIOS 204 setting a particular bit in the MSR to '1' may enable a corresponding core, such that if a bit is not set the corresponding bit is disable, without varying from the scope of this disclosure.

Referring to FIG. 4, if an individual associated with information handling system 200 selects that eighteen processor cores should be enabled, BIOS 204 of FIG. 2 may utilize the different latencies between the processor cores and integrated memory controllers 220, 222, 224, and 226 to determine the processor cores to enable. Based on the calculated latencies, BIOS 204 may determine that the first cores to enable are cores 231, 235, 271, and 275 because these cores have the best or lowest latency. BIOS 204 may also select all cores with only one hop to enable, such as cores 230, 232, 234, 236, 239, 243, 263, 267, 270, 272, 274, and 276. In response BIOS 204 selected these cores to be enabled, the number of enabled cores may equal sixteen cores. In this situation, BIOS 204 may select two more cores to enable, and the BIOS may select two of the cores that are two hops from their corresponding integrated memory controller. For example, BIOS 204 may enable core 238 associated with integrated memory controller 220, and core 262 associated with integrated memory controller 224. In certain examples, if the selected number of cores is not divisible by four, BIOS 204 may select first select a core from quadrant 1 or 2, such as processor die 210 or 212, and then select a core from quadrant 3 of 4, such as processor die 214 or 216. This selection of cores by BIOS 204 may enable the same number of cores to be enabled on each domain of MCP 202.

In response to BIOS 204 selecting or determining the cores to enable, the BIOS may disable all other cores. In an example, the enabled cores 230, 231, 232, 234, 235, 236, 238, 239, 243, 262, 263, 267, 270, 271, 272, 274, 275, and 276 are bolded in configuration 400 to identify these cores as being enabled. In this example, BIOS 204 may set the bits of the MSR as follows: 000100010011101111111111111111100111011000010001.

Based on bits 3, 7, 10, 11, 12, 14, 15, 16, 17, 18, 19, 20, 21, 22, 23, 24, 25, 26, 27, 28, 29, 30, 31, 34, 35, 36, 38, 39, 43, and 47 being set to a value of 1, all of these cores may be disabled. In this example, BIOS 204 setting a particular bit in MSR to '1' may disable the corresponding core.

Figure 5:
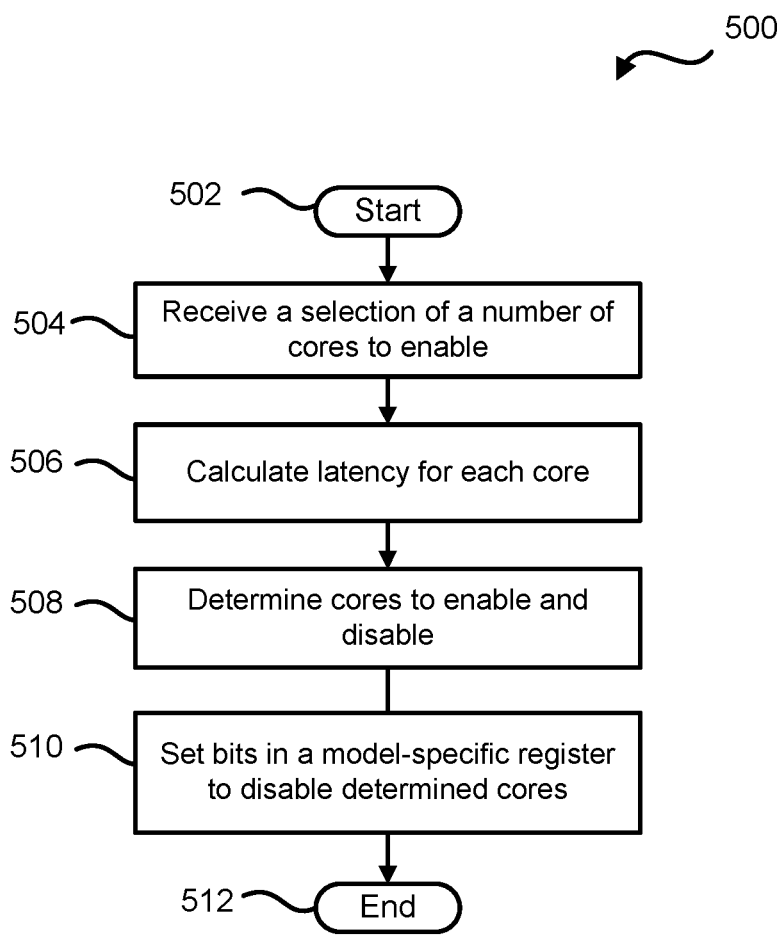
FIG. 5 illustrates a method for selecting a processor core to disable in a multiple core processor based on best latency according to an embodiment of the present disclosure.

FIG. 5 illustrates a method 500 for selecting processor core to disable in a multiple core processor based on best latency according to an embodiment of the present disclosure, starting at block 502. In an example, the method 500 may be performed by any suitable component including, but not limited to, BIOS 140 of FIG. 1 and BIOS 204 of FIG. 2. It will be readily appreciated that not every method step set forth in this flow diagram is always necessary, and that certain steps of the methods may be combined, performed simultaneously, in a different order, or perhaps omitted, without varying from the scope of the disclosure.

At block 504, a selection of a number of cores to have enabled is received. In an example, the selection of the number of cores may be received from an individual associated with the information handling system. For example, the individual may utilize any suitable interface, such as a GUI on a display device, to select a desired number of processor cores to be enabled. At block 506, a latency for each core in a multiple core processor is calculated. In certain examples, the latency may be calculated based on any suitable operations that utilize distance of a core from an associated integrated memory controller as a main consideration in the latency calculation. In an example, the latency may be affected based on the distance or number of hops between a particular processor core and the associated integrated memory controller. In this example, the more number of hops a processor core has within the communication path to the associated integrated memory controller the worse the latency of that processor core.

At block 508, cores to enable and disable are determined. In an example, the processor cores to enable as selected from best latency to worst latency for each integrated memory controller. For example, each different processor core having the best latency for the different integrated memory controllers is selected to be enabled, then each different processor core having the next best latency for each different integrated memory controllers is selected to be enabled, and this selection may continue until a number of cores enabled matches the received number. In an example, all processor cores not selected to be enabled as selected to be disabled.

At block 510, bits are set in an MSR to disable determined cores, and the flow ends at block 512. In an example, the MSR may include a number of bits equal to the number of cores in the MCP. In certain examples, the MSR may include 48 bits and setting a particular bit may disable the corresponding core. For example, bit 0 of the MSR may correspond to a first core of the MCP and bit 47 of the MSR may correspond to the last core of the MCP.

Figure 6:
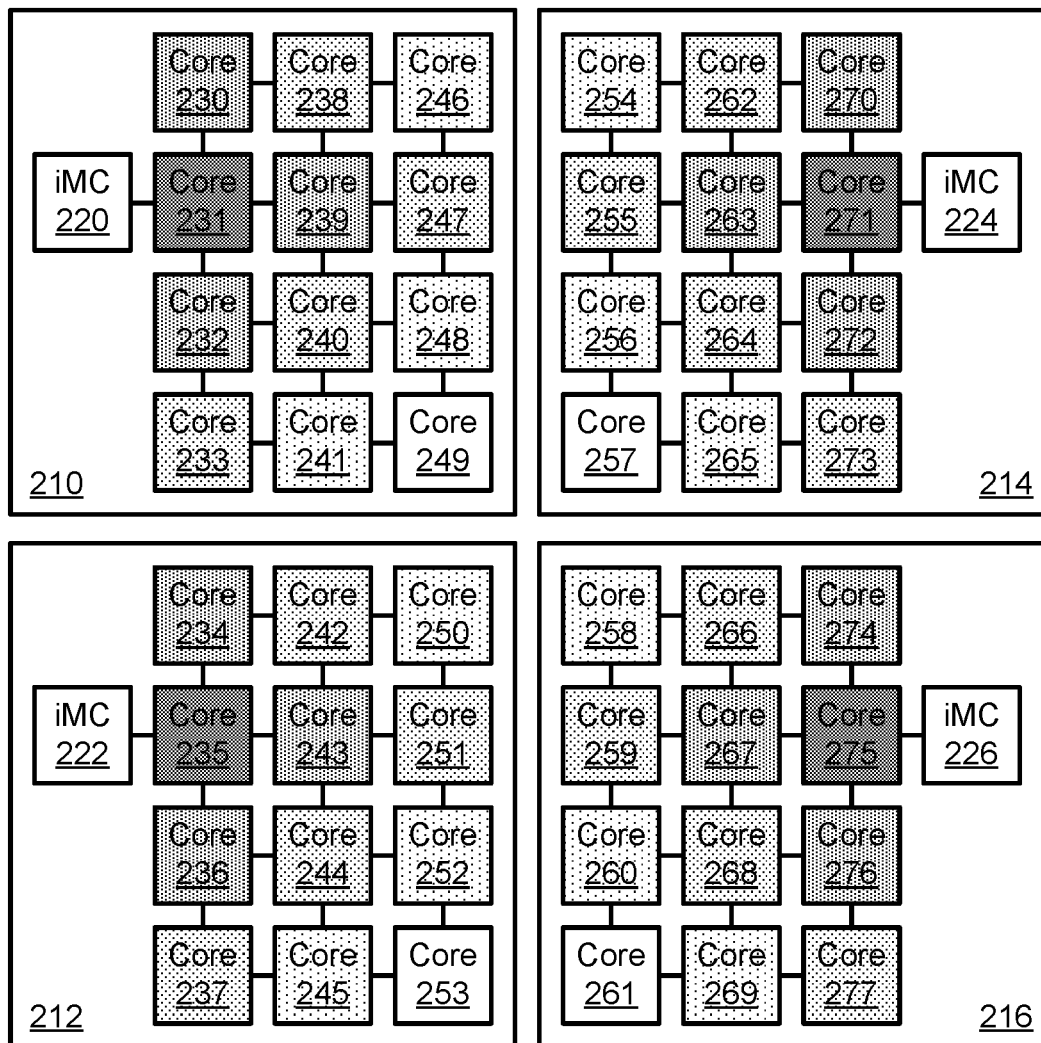
FIG. 6 illustrates a round robin mapping of processor cores in a multiple core processor based on best latency according to an embodiment of the present disclosure.

FIG. 6 illustrates a round robin mapping configuration 600 of the processor cores in MCP 202 of FIG. 2 based on best latency according to an embodiment of the present disclosure. In certain examples, the processor cores in processor dies 210, 212, 214, and 216 may be mapped to corresponding one of integrated memory controllers 220, 222, 224, and 226. In an example, an OS of information handling system 200 in FIG. 2 may be mapped to one or more processor cores based on latency to integrated memory controllers 220, 222, 224, and 226.

In previous information handling systems, the BIOS employed a round robin mapping of cores to integrated memory controllers. In these previous information handling systems, the processor cores are interleaved between sockets and domains of a MCP. In previous information handling systems, the interleaving between domains of a MCP may not properly utilize core latencies when each quadrant or processor die includes an integrated memory controller. Information handling system 200 may be improved by BIOS 204 utilizing latencies between the different cores in a processor die to the corresponding integrated memory controller 220, 222, 224, or 226 to determine what cores to the corresponding integrated memory controller. In certain examples, the latency may be calculated based on any suitable operations that utilize distance of a core from integrated memory controllers 220, 222, 224, and 226 as a main consideration in the latency calculation. BIOS 204 may perform the latency calculations and map the cores from lowest latency cores to highest latency cores.

In an example, the distance or number of hops within a communication path from a processor core to the mapped integrate memory controller may affect a speed or latency that data is read/written to a DIMM, such as DIMM 221, 223, 224, or 225 of FIG. 2. In this example, BIOS 204 may improve the overall read/write latency for DIMMs 221, 223, 224, and 225 by mapping cores on processor die 210, 212, 214, or 216 to the corresponding integrated memory controller 220, 222, 224, or 226 for that particular processor die.

In certain examples, BIOS 204 of FIG. 2 may utilize the different latencies between the processor cores and integrated memory controllers 220, 222, 224, and 226 to determine the priority in mapping processor cores to integrated memory controllers. The level of mapping priority for cores may vary from a highest priority to a lowest priority based on the level of shading for a processor core in FIG. 6. In an example, the latency may be affected based on the distance or number of hops between a particular processor core and a particular one of integrated memory controllers 220, 222, 224, and 226. In this example, core 231 may have the lowest latency with respect to integrated memory controller 220 because the core does not have any hops within a communication path with the integrated memory controller. Based on this determination, BIOS 204 may assign a high priority level to core 231 for being mapped to integrated memory controller 220. Cores 230, 232, and 239 may each have substantially the same latency based on these cores having one hop, such as core 231, within the communication path with the integrated memory controller 220. In this example, BIOS 204 may assign cores 230, 232, and 239 the same priority level in mapping the cores to integrated memory controller 220. In an example, the priority level for cores 230, 232, and 239 may be lower than the priority level of core 231.

Cores 233, 238, 240, and 247 may each have substantially the same latency based on these cores having two hops within the communication path with the integrated memory controller 220. In this example, BIOS 204 may assign cores 233, 238, 240, and 247 the same priority level in mapping the cores to integrated memory controller 220. In an example, the priority level for cores 233, 238, 240, and 247 may be lower than the priority level of cores 230, 232, and 239. Cores 241, 246, and 248 may each have substantially the same latency based on these cores having three hops within the communication path with the integrated memory controller 220. In this example, BIOS 204 may assign cores 241, 246, and 248 the same priority level in mapping the cores to integrated memory controller 220. In an example, the priority level for cores 241, 246, and 248 may be lower than the priority level of cores 233, 238, 240, and 247. Core 249 may have the worst or longest latency with respect to memory controller 220 because this core has four hops within a communication path with the integrated memory controller. In this example, BIOS 204 may assign core 249 the lowest priority level in mapping the cores to integrated memory controller 220.

In certain examples, the latency calculations for processor cores in processor dies 212, 214, and 216 to the respective integrated memory controllers 222, 224, and 226 may be substantially similar to those described above with respect to core in processor die 210 and integrated memory controller 220. For example, core 235 may have the lowest or best latency with respect to integrated memory controller 222, cores 234, 236, and 243 may have the next best latency, and core 253 may have the slowest or worst latency. In this example, core 235 may be assigned the highest mapping priority, cores 234, 236, and 243 may be assigned the next highest mapping priority, and core 253 may be assigned the lowest mapping priority with respect to integrated memory controller 222.

Similarly, core 271 may have the lowest or best latency with respect to integrated memory controller 224, cores 270, 272, and 263 may have the next best latency, and core 257 may have the slowest or worst latency. In this example, core 271 may be assigned the highest mapping priority, cores 270, 272, and 263 may be assigned the next highest mapping priority, and core 257 may be assigned the lowest mapping priority with respect to integrated memory controller 224. Core 275 may have the lowest or best latency with respect to integrated memory controller 226, cores 274, 276, and 267 may have the next best latency, and core 261 may have the slowest or worst latency. In this example, core 275 may be assigned the highest mapping priority, cores 274, 276, and 267 may be assigned the next highest mapping priority, and core 261 may be assigned the lowest mapping priority with respect to integrated memory controller 226. In response to the cores being mapped to the different integrated memory controllers, the mapping and priority levels for the processor cores are stored in a memory, such as memory 120 or 125 of FIG. 1.

Figure 7:
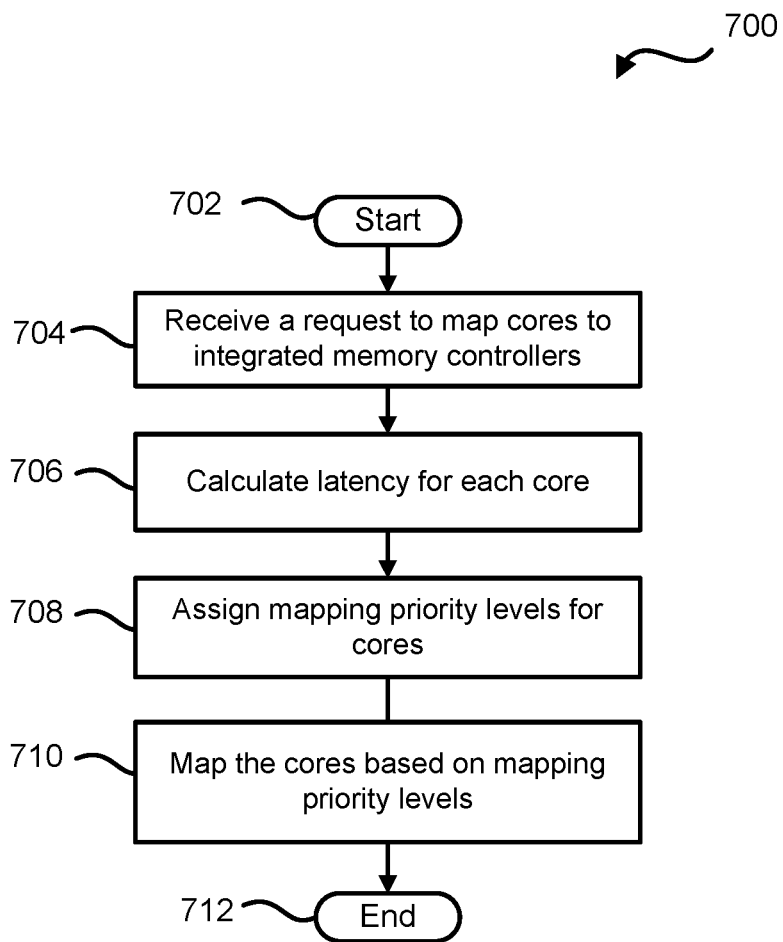
FIG. 7 illustrates a method for round robin mapping of processor cores based on best latency according to an embodiment of the present disclosure.

FIG. 7 illustrates a method 700 for round robin mapping of processor cores based on best latency according to an embodiment of the present disclosure, starting at block 702. In an example, the method 700 may be performed by any suitable component including, but not limited to, BIOS 140 of FIG. 1 and BIOS 204 of FIG. 2. It will be readily appreciated that not every method step set forth in this flow diagram is always necessary, and that certain steps of the methods may be combined, performed simultaneously, in a different order, or perhaps omitted, without varying from the scope of the disclosure.

At block 704, a request to map processor cores to integrated memory controllers in a MCP is received. In an example, the may be received from any suitable source, such as a BIOS setting during a system boot, from an individual associated with the information handling system, or the like. At block 706, a latency for each core in a multiple core processor is calculated. In certain examples, the latency may be calculated based on any suitable operations that utilize distance of a core from an associated integrated memory controller as a main consideration in the latency calculation. In an example, the latency may be affected based on the distance or number of hops between a particular processor core and the associated integrated memory controller. In this example, the more number of hops a processor core has within the communication path to the associated integrated memory controller the worse the latency of that processor core.

At block 708, mapping priority levels are assigned. In an example, mapping priority levels are assigned based on the latency of the processor cores. For example, a core with the lowest or best latency for a particular integrated memory controller is assigned the highest mapping priority level for that particular integrated memory controller. In certain examples, as the latency of processor increases the mapping priority level decreases. At block 710, cores are mapped to integrated memory controllers, and the flow ends at block 712. In an example, the cores are mapped to different integrated memory controllers based on the mapping priority level for the cores. In response to the cores being mapped to the different integrated memory controllers, the mapping and priority levels for the processor cores are stored in a memory.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a model-specific register; and
a basic input/output system (BIOS) to communicate with the model-specific register, the BIOS to:
receive a selection of a number of processor cores to have enabled in a multiple core processor;
in response to the reception of the selection of the number of processor cores to have enabled, calculate a different latency for each of a plurality of processor cores in the multiple core processor;
based on the calculated different latency for each of the processor cores, determine a first subset of the processor cores to enable and a second subset of the processor cores to disable; and
set bits in the model-specific register to indicate that the first subset of the processor cores is enabled and the second subset of the processor cores is disabled, wherein the bits in the model-specific register being set, the BIOS further to set a bit associated with a first processor core to a particular value based on the first processor core having a worst latency for a first integrated memory controller, wherein the particular value of the bit indicates that the first processor core is disabled.

2. The information handling system of claim 1, further comprising a dual in-line memory module, wherein a first latency between a first processor core and a first integrated memory controller controls a latency that data is read from/written to the dual inline memory module by the first processor core.

3. The information handling system of claim 1, wherein each of the different latencies for each of the processor cores is calculated with respect to different distances between each of the processor cores and an associated one of the integrated memory controllers.

4. The information handling system of claim 3, wherein the different distances are associated with a different number of hops in different communication paths between each of the processor cores and the associated one of the integrated memory controllers.

5. The information handling system of claim 1, wherein the BIOS further to select a first processor core having a best latency for a first integrated memory controller to be enabled.

6. The information handling system of claim 5, wherein the BIOS further to select a second processor core having a best latency for a second integrated memory controller to be enabled.

7. The information handling system of claim 1, further comprising a graphical user interface on a display device, wherein the selection of the number of processor cores to have enabled is received from the graphical user interface on the display device.

8. A method, comprising:
in response to receiving a selection of a number of processor cores to have enabled in a multiple core processor, determining, by a basic input/output system (BIOS) of an information handling system, a different latency for each of a plurality of processor cores in the multiple core processor;
based on the different latency for each of the processor cores, determining a first subset of the processor cores to enable and a second subset of the processor cores to disable; and
setting, by the BIOS, bits in the model-specific register to indicate that the first subset of the processor cores is enabled and the second subset of the processor cores is disabled, wherein the bits in the model-specific register being set, the method further comprises setting a bit associated with a first processor core to a particular value based on the first processor core having a worst latency for a first integrated memory controller, wherein the particular value of the bit indicates that the first processor core is disabled.

9. The method of claim 8, wherein the method further comprises calculating each of the different latencies for each of the processor cores with respect to different distances between each of the processor cores and an associated one of the integrated memory controllers.

10. The method of claim 9, wherein the different distances are associated with a different number of hops in different communication paths between each of the processor cores and the associated one of the integrated memory controllers.

11. The method of claim 8, wherein the method further comprises selecting a first processor core having a best latency for a first integrated memory controller to be enabled.

12. The method of claim 11, wherein the method further comprises selecting a second processor core having a best latency for a second integrated memory controller to be enabled.

13. The method of claim 8, wherein a first latency between a first processor core and a first integrated memory controller controls a latency that data is read from/written to a dual inline memory module by the first processor core.

14. The method of claim 8, wherein the selection is received during a system boot.

15. An information handling system, comprising:
   a first dual in-line memory module (DIMM);
   a model-specific register;
   a first processor die of a multiple core processor coupled to the first DIMM, the first processor die including a first plurality of processor cores and a first integrated memory controller to communicate with the first DIMM; and
   a basic input/output system to:
      in response to reception of a selection of a number of processor cores to have enabled, calculate a different latency for each of the first processor cores in the first processor die;
      based on the different latency for each of the processor cores, determine a first subset of the first processor cores in the first processor die to enable and a second subset of the first processor cores in the first processor die to disable; and
      set bits in the model-specific register to indicate that the first subset of the first processor cores is enabled and the second subset of the first processor cores is disabled, wherein a bit associated with one of the first processor cores is set to a particular value based on the one of the first processor cores having a worst latency for the first integrated memory controller, wherein the particular value of the bit indicates that the one of the first processor cores is disabled.

16. The information handling system of claim 15, further comprising:
   a second DIMM; and
   a second processor die coupled to the second DIMM, the second processor die including:
      a second plurality of processor cores; and
      a second integrated memory controller to communicate with the second DIMM;
   wherein the BIOS further to:
      in response to the reception of the selection of the number of processor cores to have enabled, calculate a different latency for each of the second plurality of processor cores in the second processor die;
      based on the calculated different latency for each of the second processor cores, determine a third subset of the second processor cores in the second processor die to enable and a fourth subset of the second processor cores in the second processor die to disable; and
      set bits in the model-specific register to indicate that the third subset of the second processor cores is enabled and the fourth subset of the second processor cores is disabled.

17. The information handling system of claim 15, further comprising:
   a graphical user interface on a display device, wherein the selection of the number of processor cores to have enabled is received from the graphical user interface on the display device.

* * * * *